(12) United States Patent
O'Carroll et al.

(10) Patent No.: US 11,255,204 B2
(45) Date of Patent: Feb. 22, 2022

(54) TURBINE VANE ASSEMBLY HAVING CERAMIC MATRIX COMPOSITE AIRFOILS AND METALLIC SUPPORT SPAR

(71) Applicant: Rolls-Royce plc, London (GB)

(72) Inventors: Oliver D. A. O'Carroll, London (GB); Robert S. Bainbridge, London (GB); Afzal Ali, London (GB); Rachel Woodfield, London (GB); Michael J. Whittle, London (GB)

(73) Assignee: Rolls-Royce plc

( * ) Notice: Subject to any disclaimer, the term of this patent is extended or adjusted under 35 U.S.C. 154(b) by 147 days.

(21) Appl. No.: 16/674,806

(22) Filed: Nov. 5, 2019

(65) Prior Publication Data

US 2021/0131353 A1 May 6, 2021

(51) Int. Cl.
| | |
|---|---|
| *F01D 9/04* | (2006.01) |
| *F01D 9/02* | (2006.01) |
| *F01D 25/00* | (2006.01) |
| *F01D 17/16* | (2006.01) |

(52) U.S. Cl.
CPC ............. *F01D 9/042* (2013.01); *F01D 9/02* (2013.01); *F01D 17/16* (2013.01); *F01D 25/005* (2013.01); *F05D 2240/123* (2013.01); *F05D 2240/124* (2013.01)

(58) Field of Classification Search
CPC ... F01D 9/04; F01D 9/042; F01D 9/02; F01D 5/147; F01D 5/189; F01D 5/282; F01D 17/16; F01D 25/005; F05D 2240/123; F05D 2240/124; F05D 2240/80; F05D 2300/50212; F05D 2300/6033; F05D 2260/941

See application file for complete search history.

(56) References Cited

U.S. PATENT DOCUMENTS

| | | | |
|---|---|---|---|
| 5,145,315 A * | 9/1992 | North | F01D 5/189 29/889.722 |
| 5,630,700 A * | 5/1997 | Olsen | F01D 9/042 415/134 |
| 6,000,906 A * | 12/1999 | Draskovich | F01D 17/162 415/209.4 |
| 6,514,046 B1 | 2/2003 | Morrison et al. | |
| 6,884,030 B2 | 4/2005 | Darkins, Jr. et al. | |
| 7,052,234 B2 * | 5/2006 | Wells | F16J 15/0812 415/137 |
| 7,452,189 B2 | 11/2008 | Shi et al. | |
| 7,625,170 B2 * | 12/2009 | Greene | F01D 5/188 415/110 |
| 7,824,152 B2 * | 11/2010 | Morrison | F01D 9/042 415/135 |
| 7,874,793 B2 * | 1/2011 | Razzell | F01D 11/22 415/173.1 |
| 8,292,580 B2 | 10/2012 | Schiavo et al. | |
| 9,546,557 B2 | 1/2017 | Grooms, III et al. | |

(Continued)

*Primary Examiner* — David E Sosnowski
*Assistant Examiner* — Wayne A Lambert
(74) *Attorney, Agent, or Firm* — Barnes & Thornburg LLP

(57) ABSTRACT

An airfoil assembly includes a support carrier and an airfoil unit that includes a platform, an airfoil, and a mount. The platform defines a boundary of a gas path of the airfoil assembly. The airfoil extends away from platform and the mount extends away from the platform opposite the airfoil. The support carrier is coupled with the airfoil unit and engages the mount.

20 Claims, 4 Drawing Sheets

(56) References Cited

U.S. PATENT DOCUMENTS

| | | | |
|---|---|---|---|
| 9,915,159 B2 | 3/2018 | Huizenga et al. | |
| 10,072,516 B2 | 9/2018 | Carr et al. | |
| 10,094,239 B2 | 10/2018 | Freeman et al. | |
| 10,273,818 B2 | 4/2019 | Vetters et al. | |
| 10,309,240 B2 | 6/2019 | Heitman et al. | |
| 10,392,945 B2 * | 8/2019 | Dutta | F01D 5/189 |
| 10,767,497 B2 * | 9/2020 | Vetters | F01D 9/042 |
| 2010/0021290 A1 | 1/2010 | Schaff et al. | |
| 2016/0123163 A1 | 6/2016 | Tuertscher et al. | |
| 2016/0169033 A1 * | 6/2016 | Weaver | F01D 25/005 |
| | | | 415/200 |
| 2016/0177761 A1 | 6/2016 | Huizenga et al. | |
| 2016/0290147 A1 | 10/2016 | Weaver | |
| 2020/0088048 A1 * | 3/2020 | Whittle | F01D 5/284 |

* cited by examiner

TURBINE VANE ASSEMBLY HAVING CERAMIC MATRIX COMPOSITE AIRFOILS AND METALLIC SUPPORT SPAR

FIELD OF THE DISCLOSURE

The present disclosure relates generally to airfoil assemblies for gas turbine engines, and more specifically to airfoil assemblies that comprise ceramic containing materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine are conducted toward airfoils included in stationary vanes and rotating blades of the turbine. The airfoils are often made from high-temperature resistant materials and/or are actively cooled by supplying relatively cool air to the vanes and blades due to the high temperatures of the combustion products. To this end, some airfoils for vanes and blades are incorporating composite materials adapted to withstand very high temperatures. Design and manufacture of vanes and blades from composite materials presents challenges because of the geometry and strength desired for the parts.

SUMMARY

The present disclosure may comprise one or more of the following features and combinations thereof.

An airfoil assembly for a gas turbine engine may include a metallic support carrier, a ceramic matrix composite vane, a bias arm, and an expansion pad. The metallic support carrier may have a first coefficient of thermal expansion. The ceramic matrix composite vane may be adapted to interact with hot gases flowing through a gas path of the gas turbine engine during use of the airfoil assembly. The bias arm may be coupled to the metallic support carrier and engage with a vane mount of the ceramic matrix composite vane. The expansion pad may be located between the metallic support carrier and the bias arm and configured to engage the bias arm.

In some embodiments, the metallic support carrier may include a wall and a flange. The flange may extend axially away from the wall relative to an axis. In some embodiments, the flange may have a first portion and a second portion. The second portion may be spaced apart from the first portion to define a vane-receiver space there between. In some embodiments, the expansion pad may be located between the first portion of the flange and the bias arm.

In some embodiments. Expansion pad may have a second coefficient of thermal expansion that is greater than the first coefficient of thermal expansion. In this way, the expansion pad may be configured to grow away from the first portion of the flange and engage the bias arm. The expansion pad may engage the bias arm to cause the bias arm to move and urge the vane mount into engagement with the second portion in response to growth of the expansion pad during use of the airfoil assembly.

In some embodiments, the ceramic matrix composite vane may include a first platform, a second platform, an airfoil, and the vane mount. The first platform may define a first boundary of the gas path. The second platform may be spaced apart axially from the first platform relative to the axis to define a second boundary of the gas path. The airfoil may extend axially between and interconnect the first platform and the second platform. The vane mount may extend axially away from the first platform and may be located in the vane-receiver space defined by the flange of the metallic support carrier.

In some embodiments, the bias arm may extend between a first end and a second end. The first end may be fixed with the first portion of the flange. The second end may be cantilevered away from the first portion of the flange.

In some embodiments, the expansion pad may engage the bias arm at a location between a midpoint of the bias arm and the first end of the bias arm. The expansion pad may engage the bias arm at the location to urge the second end into engagement with the vane mount of the ceramic matrix composite vane.

In some embodiments, the first portion of the flange may be formed to define a recess. The recess may extend into the first portion. In some embodiments, at least a portion of the expansion pad may be located in the recess.

In some embodiments, the second portion of the flange may be formed to define loads pads. The load pads may extend away from the second portion of the flange and engage the vane mount of the ceramic matrix composite vane opposite the bias arm.

In some embodiments, the ceramic matrix composite vane may have a leading edge, a trailing edge, a pressure side, and a suction side. In some embodiments, the bias arm and the expansion pad may be located between the pressure side of the vane mount and the first portion of the flange.

In some embodiments, the second portion of the flange may be formed to define at least one load pad. The at least one load pad may extend away from the second portion of the flange and engage the suction side of the vane mount.

In some embodiments, the at least one load pad may have a third coefficient of thermal expansion. The third coefficient of thermal expansion may be greater than the first coefficient of thermal expansion.

In some embodiments, the airfoil assembly may further include a metallic spar. The metallic spar may be coupled with the wall of the metallic support carrier. The metallic spar may extend axially through an interior cavity formed in the ceramic matrix composite vane.

According to another aspect of the present disclosure, an airfoil assembly for a gas turbine engine may include a support carrier, an airfoil unit, a bias arm, and an expansion pad. The support carrier may include a wall and a flange that extends axially away from the wall relative to an axis. The airfoil unit may include a platform, an airfoil that extends axially away from the platform, and a mount that extends axially away from the platform in a direction opposite the airfoil. The bias arm may be coupled to the support carrier and engage with the mount of the airfoil unit. The expansion pad may be located between the flange and the bias arm.

In some embodiments, the support carrier may have a first coefficient of thermal expansion and the expansion pad may have a second coefficient of thermal expansion. The second coefficient of thermal expansion may be greater than the first coefficient of thermal expansion.

In some embodiments, the bias arm may extend between a first end and a second end thereof. The first end may be fixed to the flange. The second end may be cantilevered away from the flange.

In some embodiments, the expansion pad may engage the bias arm at a location between a midpoint of the bias arm and the first end of the bias arm. The expansion pad may engage the bias arm at the location to urge the second end of the bias arm into engagement with the mount of the airfoil unit.

In some embodiments, the flange may be formed to define a recess. The recess may extend into the flange. In some embodiments, at least a portion of the expansion pad may be located in the recess.

In some embodiments, the airfoil unit may have a leading edge, a trailing edge, a pressure side, and a suction side. The expansion pad may be located between the mount and the flange on the pressure side.

In some embodiments, the flange may be formed to define at least one load pad. The at least one load pad may extend away from the flange and engage the mount.

In some embodiments, the at least one load pad has a third coefficient of thermal expansion. The third coefficient of thermal expansion may be greater than the first coefficient of thermal expansion.

According to another aspect of the present disclosure, an airfoil assembly for a gas turbine engine may include a support carrier, an airfoil unit, a bias arm, and an expansion pad. The support carrier may have a first coefficient of thermal expansion. The airfoil unit may include a platform, an airfoil that extends axially away from the platform relative to an axis, and a mount that extends axially away from the platform in a direction opposite the airfoil. The bias arm may be coupled to the support carrier and engage with the mount of the airfoil unit. The expansion pad may be located between the support carrier and the bias arm.

In some embodiments, the expansion pad may have a second coefficient of thermal expansion. The second coefficient of thermal expansion may be greater than the first coefficient of thermal expansion.

In some embodiments, the bias arm may extend between a first end and a second end thereof. The first end may be fixed to the support carrier. The second end may be cantilevered away from the support carrier.

In some embodiments, the expansion pad may engage the bias arm at a location between a midpoint of the bias arm and the first end of the bias arm. The expansion pad may engage the bias arm at the location to urge the second end of the bias arm into engagement with the mount of the airfoil unit.

In some embodiments, the support carrier may be formed to define a recess. The recess may extend into the support carrier. In some embodiments, at least a portion of the expansion pad is located in the recess.

In some embodiments, the airfoil unit has a leading edge, a trailing edge, a pressure side, and a suction side. In some embodiments, the expansion pad may be located between the mount and the support carrier on the pressure side.

In some embodiments, the support carrier includes a wall and a flange. The wall may extend radially at least partway about the axis. The flange may extend axially away from the wall relative to the axis. In some embodiments, the flange may be formed to define at least one load pad that extends away from the flange and engages the mount.

In some embodiments, the at least one load pad may have a third coefficient of thermal expansion. The third coefficient of thermal expansion may be greater than the first coefficient of thermal expansion.

According to another aspect of the present disclosure, a method may include several steps. The method may include providing an airfoil assembly. The airfoil assembly may include a support carrier, a vane, a bias arm, and an expansion pad.

In some embodiments, the support carrier may have a first coefficient of thermal expansion and include a wall and a flange. The flange may extend away from the wall.

In some embodiments, the flange may have a first portion and a second portion. The second portion may include contact pads.

In some embodiments, the expansion pad may have a second coefficient of thermal expansion. The second coefficient of thermal expansion may be greater than the first coefficient of thermal expansion. In some embodiments, the expansion pad may be located between the first portion of the flange and the bias arm.

In some embodiments, the method may further include heating the airfoil assembly to cause the expansion pad to grow relative to the flange and engage the bias arm. The expansion pad may engage the bias arm to move the bias arm to urge the vane into engagement with the contact pads.

In some embodiments, the bias arm may include a first end fixed to the flange and a second end. The second end may be cantilevered away from the first portion of the flange.

In some embodiments, the first portion of the flange may be formed to define a recess. The recess may extend into the first portion. In some embodiments, at least a portion of the expansion pad may be located in the recess.

In some embodiments, the vane has a leading edge, a trailing edge, a pressure side, and a suction side. The bias arm and the expansion pad may be arranged on the pressure side of the vane.

These and other features of the present disclosure will become more apparent from the following description of the illustrative embodiments.

DETAILED DESCRIPTION OF THE DRAWINGS

Figure 1:
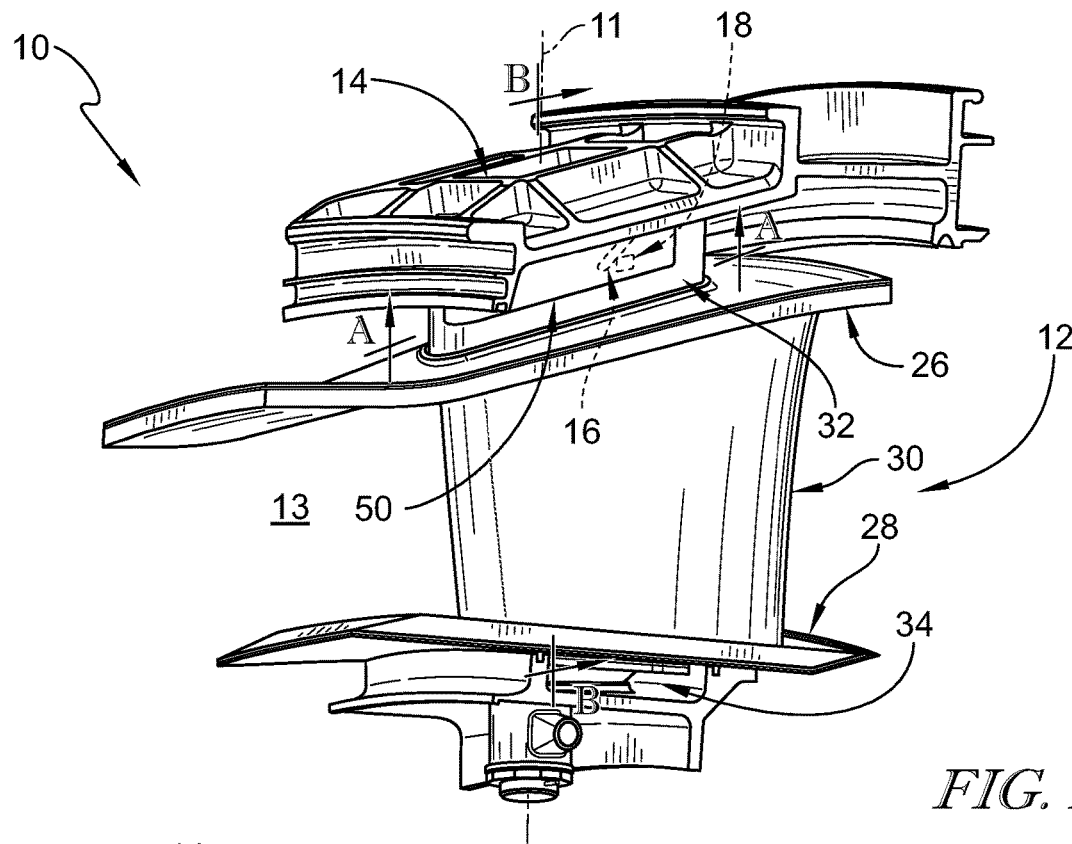
FIG. 1 is a perspective view of an airfoil assembly adapted for use in a gas turbine engine, the airfoil assembly includes a ceramic matrix composite vane adapted to interact with hot gases flowing through a gas path of the gas turbine engine and a metallic support carrier that extends axially through an interior cavity formed in the vane.

For the purposes of promoting an understanding of the principles of the disclosure, reference will now be made to a number of illustrative embodiments illustrated in the drawings and specific language will be used to describe the same.

An airfoil assembly 10 according to the present disclosure and adapted for use in a gas turbine engine is shown in FIG. 1. The airfoil assembly 10 includes a vane 12, a support carrier 14, a bias arm 16, and an expansion pad 18 as shown in FIGS. 2-6. The vane 12 is adapted to interact with hot gases flowing through a gas path 13 of the gas turbine engine during use of the airfoil assembly 10.

Figure 2:
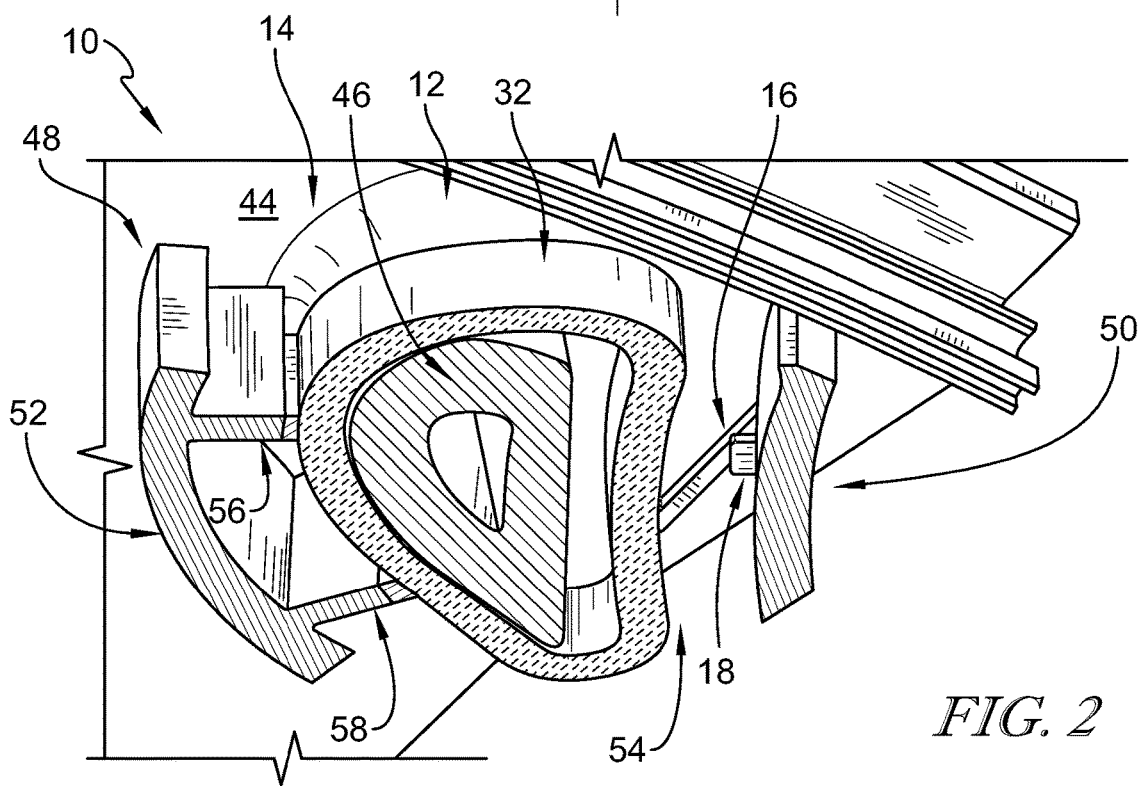
FIG. 2 is a perspective and section view of a portion of the airfoil assembly of FIG. 1 showing the airfoil assembly further includes a bias arm and an expansion pad arranged between the support carrier and the bias arm, the expansion pad having a coefficient of thermal expansion greater than that of the support carrier to cause the expansion pad to grow and urge the bias arm into engagement with vane during use of the airfoil assembly to maintain engagement of the vane with the support carrier.

The support carrier 14 extends at least partway around the vane 12 and axially through an interior cavity 24 formed in the vane 12 relative to an axis 11 as suggested in FIG. 2. The bias arm 16 is coupled with the support carrier 14 and engages with the vane 12. The expansion pad 18 is arranged between the bias arm 16 and a portion of the support carrier 14 and is configured to thermally expand during use of the airfoil assembly 10 to engage and move the bias arm 16, which in turn engages the vane 12 to maintain engagement of the vane 12 with the support carrier 14 even as the components grow thermally relative to one another during use of the airfoil assembly 10.

The vane 12 comprises ceramic matrix materials while the support carrier 14, the bias arm 16, and the expansion pad 18 comprise metallic materials in the illustrative embodiment. The ceramic matrix composite vane 12 is adapted to withstand high temperatures, while the metallic support carrier 14 is adapted to support the vane 12 relative to an associated turbine case. The vane 12 is configured to shield the metallic materials of the support carrier 14 that may not be capable of withstanding such high temperatures experienced by the ceramic materials of the vane 12. However, metallic support carrier 14 may have a coefficient of thermal expansion greater than that of the ceramic vane 12, which may cause the metallic support carrier 14 to grow away from the ceramic vane 12 during use of the airfoil assembly 10.

To combat this difference in thermal expansion, the metallic support carrier 14 has a first coefficient of thermal expansion, while the expansion pad 18 has a second coefficient of thermal expansion that is greater than the first coefficient of thermal expansion. In this way, the expansion pad 18 is configured to grow away from the support carrier 14 toward the vane 12 at a greater rate than the metallic support carrier 14 grows away from the vane 12. The expansion pad 18 urges the bias arm 16 into engagement with the vane 12 as it grows. In turn, the bias arm 16 is moved by the expansion pad 18 and maintains engagement with the vane 12 to urge and maintain the vane 12 into engagement with load pads 56, 58 formed in the support carrier 14 during use of the airfoil assembly 10.

The ceramic matrix composite vane 12 includes outer and inner platforms 26, 28, an airfoil 30, and outer and inner vane mounts 32, 34 as shown in FIGS. 2-6. The outer platform 26 defines a first boundary, or outer boundary of the gas path 13. The inner platform 28 is spaced apart axially from the outer platform 26 relative to the axis 11 to define a second boundary, or inner boundary of the gas path 13. The airfoil 30 extends axially between and interconnects the outer platform 26 and the inner platform 28. The outer vane mount 32 extends axially away from the outer platform 26, while the inner vane mount 34 extends axially away from the inner platform 28.

Figure 5:
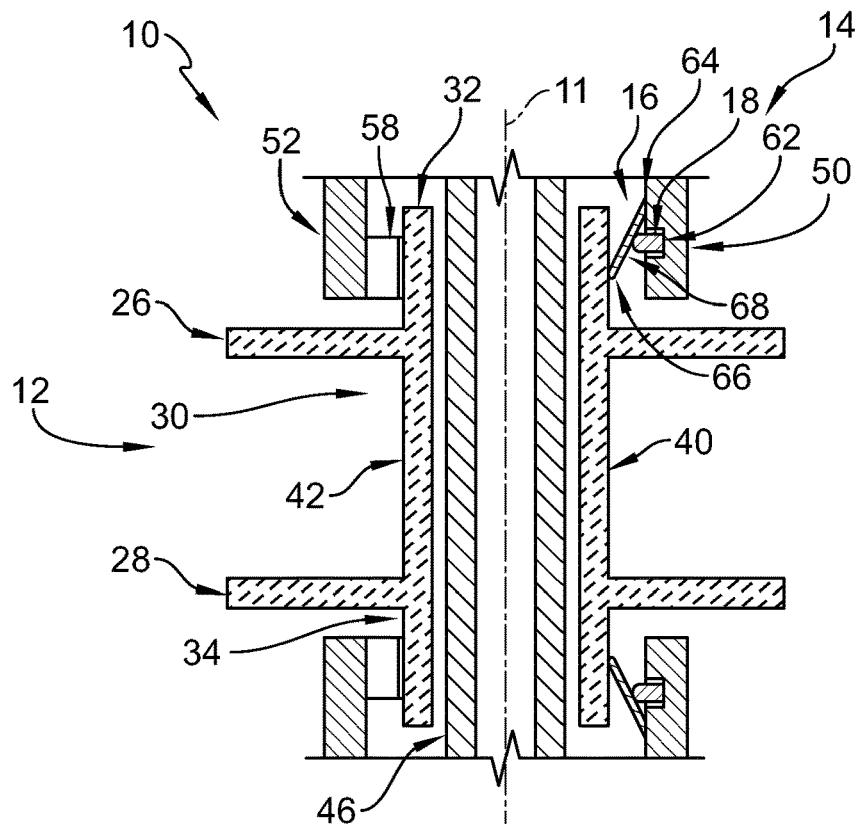
FIG. 5 is a cross-section view of the airfoil assembly of FIG. 1 taken along line B-B showing the turbine vane includes outer and inner platforms that define a gas path of the gas turbine engine, an airfoil that extends axially between the outer and inner platforms, and an outer mount that extends axially outward from the outer platform, and further showing the bias arm at cold build is arranged between the flange and the outer mount of the vane axially outward of the gas path.
Figure 6:
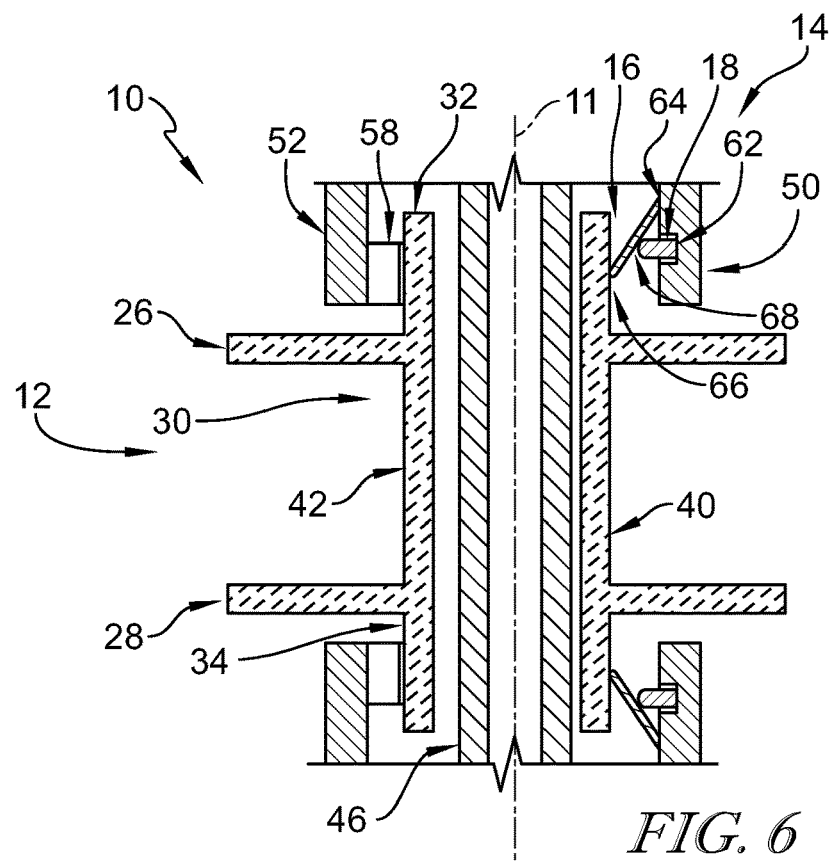
FIG. 6 is a view similar to FIG. 5 showing the first and second portions have grown away from the outer mount of the vane during use of the airfoil assembly in the gas turbine engine, and further showing the expansion pad has expanded to engage the bias arm and maintain engagement of the outer mount of the vane with the flange.

The bias arm 16 and the expansion pad 18 are described as being used with the outer vane mount 32 in the present disclosure. As shown in FIGS. 5 and 6, the bias arm and expansion pad features may be used with the inner vane mount 34. The bias arm and expansion pad features may be used with one or both of the outer and inner vane mounts 32, 34.

Additionally, the bias arm and expansion pad features may be used with other components such as, for example, seal segments or blades. As such, the vane 12 may be considered to be a type of an airfoil unit. Airfoil units can include a platform, an airfoil that extends away from the platform, and a mount that extends away from the platform opposite the airfoil. An airfoil unit may be a blade for a turbine wheel for example, a vane like the vane 12, or any other suitable alternative.

The vane 12 has a leading edge 36, a trailing edge 38, a pressure side 40, and a suction side 42 as shown in FIGS. 2-6. The trailing edge 38 is spaced radially apart from the leading edge 36 of the vane 12. The pressure side 40 is radially spaced apart from the suction side 42. The suction side 42 and pressure side 40 extend between and interconnect the leading edge 36 and the trailing edge 38.

The metallic support carrier 14 includes a wall 44, a metallic spar 46, and a flange 48 as shown in FIGS. 2-6. The wall 44 extends radially at least partway relative to the axis 11. The metallic spar 46 extends axially inward from the wall 44 through the interior cavity 24 of the vane 12. The flange 48 extends axially away from the wall 44. The metallic spar 46 is integrally formed with the wall 44 in the illustrative embodiments.

Figure 3:
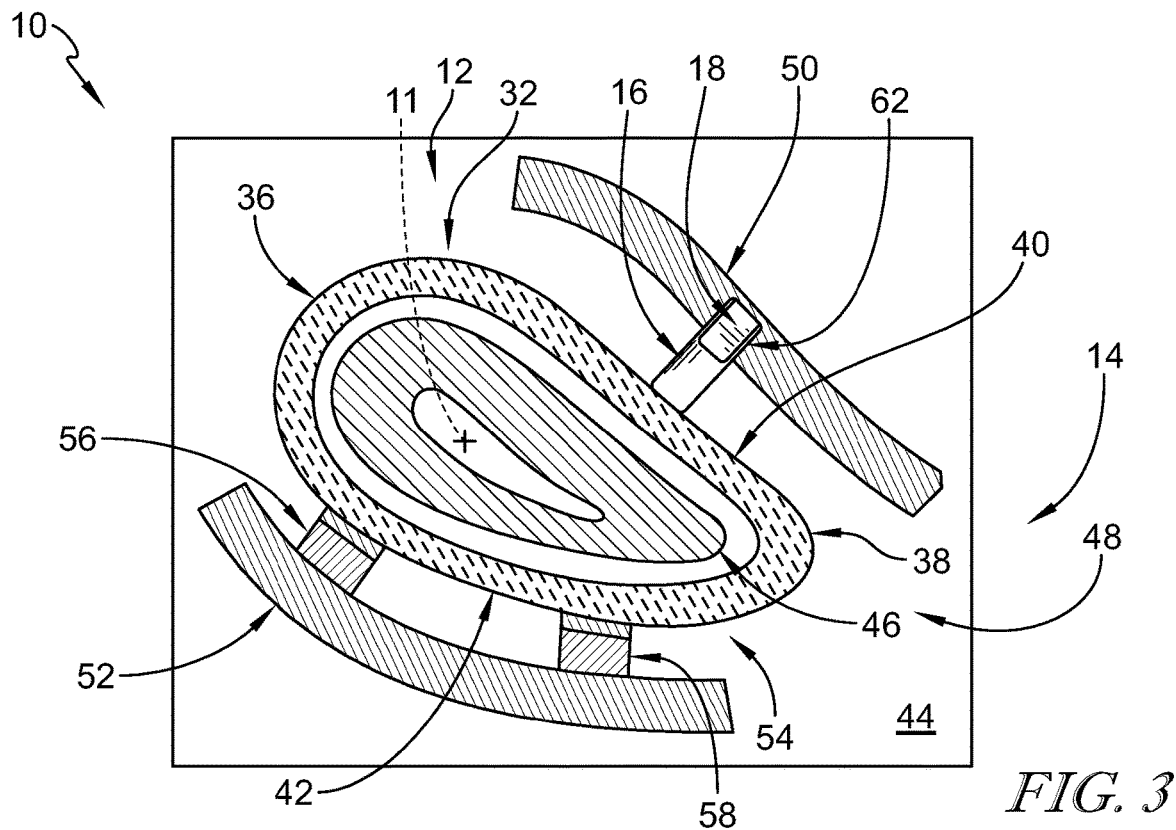
FIG. 3 is a cross-section view of the airfoil assembly of FIG. 1 taken along line A-A showing the support carrier includes a wall and a flange that extends axially inward from the wall, the flange having a first portion that extends around a portion of a pressure side of the vane and a second portion that extends around a portion of the suction side of the vane, and further showing the expansion pad and bias arm at cold build are arranged between the flange and the vane on the pressure side of the vane.
Figure 4:
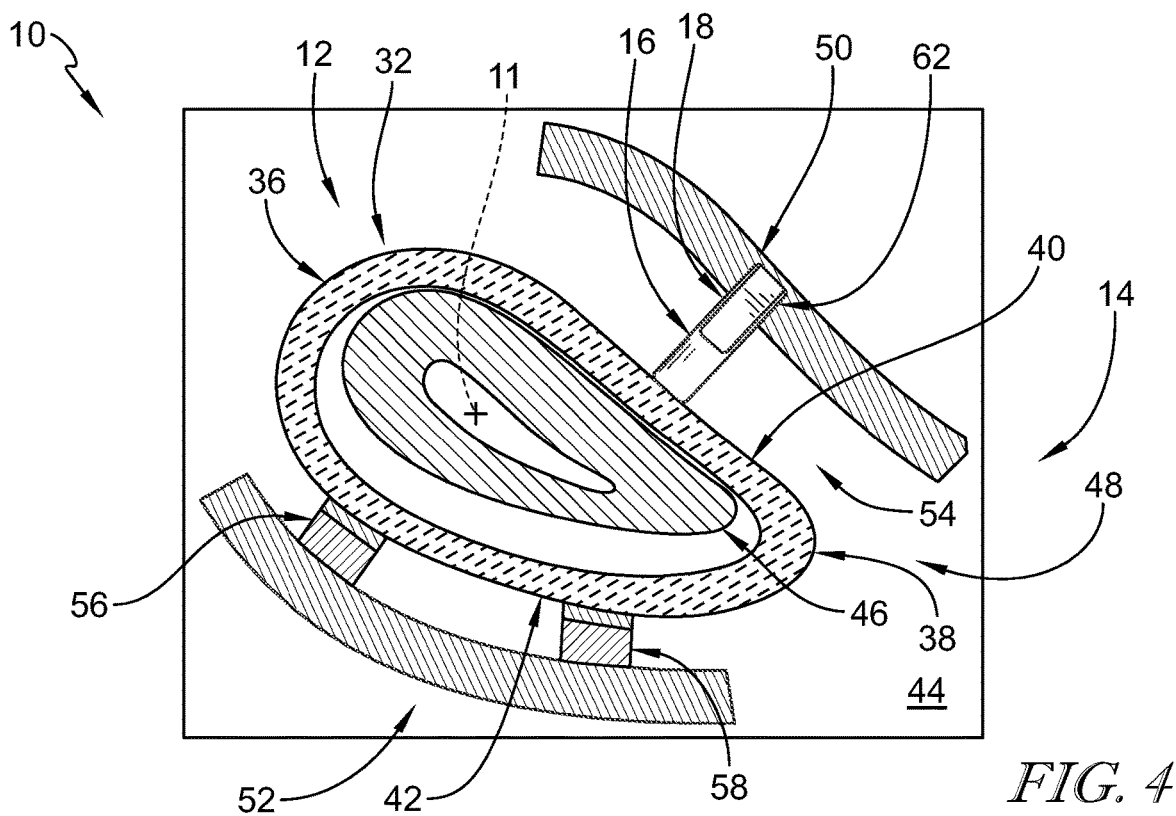
FIG. 4 is a view similar to FIG. 3 showing the first and second portions of the flange have grown away from the vane during use of the airfoil assembly in gas turbine engine, and further showing the expansion pad has expanded in sized to urge the bias arm into maintaining engagement with the vane even as the flange grows away from the vane due to thermal expansion.

The flange 48 includes a first portion 50 and a second portion 52 as shown in FIGS. 2-6. The first portion 50 extends around a portion of the pressure side 40 of the outer vane mount 32. The second portion 52 extends around a portion of the suction side 42 of the outer vane mount 32. In the illustrative embodiment, the second portion 52 is spaced apart from the first portion 50 to define a vane-receiver space 54 therebetween as shown in FIGS. 3 and 4. The outer vane mount 32 is located in the vane-receiver space 54 defined by the flange 48 of the support carrier 14.

In other embodiments, the flange 48 may be continuous so that the first and second portions 50, 52 are different portions of a single piece, continuous looped flange 48. In some embodiments, the flange 48 may be segmented into a plurality of portions for each contact point on the outer vane mount 32.

In the illustrative embodiment, the metallic spar 46 extends axially inward from the wall 44 between the first portion 50 and the second portion 52 of the flange 48. The vane-receiver space 54 is between the first and second portions 50, 52 of the flange 48 and the metallic spar 46 in the illustrative embodiment. In other embodiments, the first and second portions 50, 52 extend completely around the leading edge 36, the trailing edge 38, the pressure side 40, and the suction side 42 of the outer vane mount 32. The first portion 50 of the flange 48 is formed to define a recess 62 as shown in FIGS. 3-6. The recess 62 extends into the first portion 50. The expansion pad 18 is coupled to the first portion 50 of the flange 48 on the pressure side 40 of the outer vane mount 32, and at least a portion of the expansion pad 18 is located in the recess 62. The recess 62 is formed in the first portion 50 so that the expansion pad 18 may be sized accordingly. The recess 62 allows the expansion pad 18 to be of greater size so that the change in size of the expansion pad due to thermal growth is greater. This allows for increased movement of the bias arm 16 compared to an expansion pad of a lesser size.

The second portion 52 of the flange 48 is formed to define a first load pad 56 and a second load pad 58 as shown in FIGS. 3-6. The first load pad 56 extends away from the second portion 52 of the flange 48. The second load pad 58 is spaced apart from the first load pad 56 along the second portion 52 of the flange 48 and extends from the second portion 52 of the flange 48. In the illustrative embodiment, the first load pad 56 engages suction side 42 of the outer vane mount 32 and the second load pad 58 engages the suction side 42 of the outer vane mount 32 at a location spaced apart from the first load pad 56.

In the illustrative embodiment, the second portion 52 extends between the load pads 56, 58. In other embodiments, the second portion 52 may be split into separate portions for each load pad 56, 58. In some embodiments, more than two load pads 56, 58 may be used to contact the outer vane mount 32. In such embodiments, the second portion 52 of the flange 48 may be a plurality of segments that extend radially inward from the wall 44 and are each formed to include a load pad 56, 58 that engages the suction side 42 of the vane outer vane mount 32.

In the illustrative embodiment, the load pads 56, 58 are arranged to engage the suction side 42 of the vane mount 32 on either side of the resultant aerodynamic load vector. The precise locations of the pads 56, 58 may be configured to equally share loading at each contact point. In other embodiments, the load pads 56, 58 are located on the pressure side 40 and the expansion pad 18 and bias arm 16 are located on the suction side 42.

In the illustrative embodiment, the load pads 56, 58 have a third coefficient of thermal expansion. The third coefficient of thermal expansion of the load pads 56, 58 may be optimized based so that the load pads 56, 58 properly engage the vane 12 and securely hold the vane 12 in place. The third coefficient of thermal expansion may be greater than or equal to the first coefficient of thermal expansion. The third coefficient of thermal expansion may be equal to or less than the second coefficient of thermal expansion. As such, the load pads 56, 58 act as expansion pads and help urge the mount 32 into engagement with the load pads 56, 58 and the expansion pad 18 to keep the mount 32 engaged and loaded throughout different engine operating conditions.

The bias arm 16 has a first end 64, a second end 66, and a body 68 as shown in FIGS. 5 and 6. The first end 64 is fixed with the first portion 50 of the flange 48. The second end 66 is cantilevered away from the first portion 50 of the flange 48 and engages the outer vane mount 32 on the pressure side of the vane 12. The body 68 extends between and interconnects the first end 64 and the second end 66. The bias arm 16 may have a coefficient of thermal expansion that is greater than the coefficient of thermal expansion of the support carrier 14.

In the illustrative embodiment, the first end 64 of the bias arm 16 is axially aligned with the expansion pad 18 as shown in FIGS. 3-6. The expansion pad 18 engages the body 68 closer toward the first end 64 of the bias arm 16 to urge the second end 66 into engagement with the outer vane mount 32. The expansion pad 18 engages the body 68 between a midpoint of the bias arm 16 and the first end 64 of the bias arm 16 in the illustrative embodiment. In other embodiments, the expansion pad 18 may engage the body 68 of the bias arm 16 at any point between the first end 64 and the second end 66.

In other embodiments, the bias arm 16 and the expansion pad 18 may be coupled to the spar 46 and engage the vane mount 32 in the interior cavity 24 of the vane 12. In such embodiments, the first end 64 of the bias arm 16 may be coupled to the spar 46 and the second end 66 may engage the vane mount 32. The expansion pad 16 may be coupled with the spar 46 and expand away from the spar 46 to engage the bias arm 16 and urge the bias arm 16 into engagement with the vane 12.

In some embodiments, where the bias arm 16 and the expansion pad 18 are coupled to the spar 46, the bias arm 16 and the expansion pad 18 may be located between the suction side 42 of the vane mount 32 and the spar 46. In such embodiments, the spar 46 may also be shaped to include the load pads 56, 58. The load pads 56, 58 may extend from the spar 46 and engage the vane mount 32 in the interior cavity 24 on the pressure side of the vane 12.

In some embodiments, the spar 46 may also be formed to define a recess that extends into the spar 46. The expansion pad 18 may be located in the recess 62 on the suction side 42 of the vane mount 32.

A method of assembling and using the airfoil assembly 10 in the gas turbine engine may include several steps. The method includes arranging the support spar 46 through the interior cavity 24 to locate the outer vane mount 32 within the vane-receiver space 54, engaging the outer vane mount 32 with the bias arm 16 in the vane-receiver space 54, and heating the airfoil assembly 10 to cause the expansion pad 18 to grow relative to the flange 48, engage the bias arm 16, and maintain engagement of the vane 12 with the flange 48. In some embodiments, the method may include heating the airfoil assembly 10 to cause the expansion pad 18 to grow relative to the first portion 50 of the flange 48 and urge the vane 12 into engagement with the load pads 56, 58 on the second portion 52.

Figure 7:
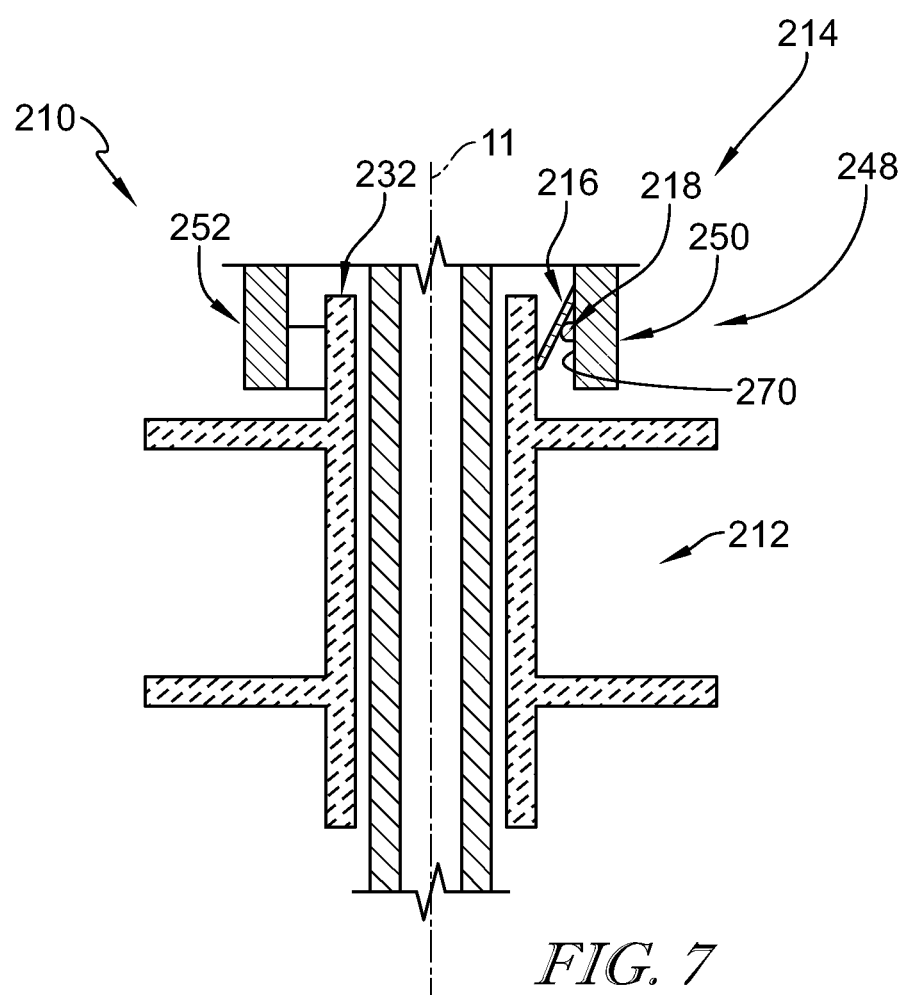
FIG. 7 is a cross-section view of another embodiment of an airfoil assembly showing the airfoil assembly includes a vane, a support carrier, a bias arm, and an expansion pad arranged between the support carrier and the bias arm that has a coefficient of thermal expansion greater than that of the support carrier to urge the bias arm into engagement with vane during use of the airfoil assembly, and further showing the expansion pad is coupled to a surface of the support carrier and does not extend into the support carrier.

Another embodiment of an airfoil assembly 210 in accordance with the present disclosure is shown in FIG. 7. The airfoil assembly 210 is substantially similar to the airfoil assembly 10 shown in FIGS. 1-6 and described herein. Accordingly, similar reference numbers in the 200 series indicate features that are common between the airfoil assembly 10 and the airfoil assembly 210. The description of the airfoil assembly 10 is incorporated by reference to apply to the airfoil assembly 210, except in instances when it conflicts with the specific description and the drawings of the airfoil assembly 210.

The airfoil assembly 210 includes a vane 212, a support carrier 214, a bias arm 216, and an expansion pad 218 as shown in FIG. 7. The bias arm 216 is coupled with the support carrier 214 and engages with the vane 212. The expansion pad 218 is arranged between the bias arm 216 and a portion of the support carrier 214 and is configured to thermally expand during use of the airfoil assembly 210 to engage and move the bias arm 216, which in turn engages the vane 212 to maintain engagement of the vane 212 with the support carrier 214.

The metallic support carrier 214 includes a flange 248 having a first portion 250 and a second portion 252 as shown in FIG. 7. In the illustrative embodiment, the expansion pad 218 is coupled to a surface 270 of the first portion of the flange 248 that faces an outer mount 232 of the vane 212.

The present disclosure relates to managing the relative thermal growth mismatch between a ceramic matrix composite vane 12 and a metallic support structure 14 using compliance through appropriately shaped sliding features 16. In other embodiments, the expansion pad 18 and bias arm 16 may be used to locate and load a blade, seal segment, or any other suitable structure in the gas turbine engine. As such, the vane 12 may be considered a first component of a gas turbine engine and the support structure may be a second component of the gas turbine engine.

In some embodiments, the load from the turbine vane 12 is transmitted outboard to the high-pressure turbine casing. In some embodiments, to transfer the aerodynamic loading applied to the ceramic matrix composite vane, the load is transmitted at both the inner and outer extents of the vane through a metallic structure or spar out into the casing.

The present disclosure teaches an airfoil assembly 10 that includes a metallic support carrier 14 to transfer the aerodynamic loading imparted on the ceramic matrix composite vane 12. In the illustrative embodiments, the aerodynamic load may be transferred through two joints, one at the outer annulus (i.e. the outer vane mount 32) and the other at the inner annulus (i.e. the inner vane mount 34). Use of the expansion pad 18 and bias arm 16 is shown for the outer vane mount 32. The expansion pad 18 and bias arm 16 and other features such as the flange and load pads 56, 58 may be used with the inner vane mount 34 and would look similar to the images shown in FIGS. 3 and 4.

In the illustrative embodiments, the airfoil assembly 10 includes the expansion pad 18 to urge the vane 12 into engagement with the load transfer features 56, 58 on the support carrier 14. The expansion pad 18 may be arranged at either the outer vane mount 32 or the inner vane mount 34.

In the illustrative embodiment, the expansion pad 18 is shown at the outer vane mount 32 of the vane 12 so that the aerodynamic load may be transferred directly to the outer casing. The load may be transferred from the external surface of the ceramic matrix composite vane 12. If no features like the expansion pad 18 and/or bias arm 16 are used, there may be a risk of losing contact with the external surface of the outer vane mount 32 when the airfoil assembly 10 heats up and the metallic support carrier 14 expands radially outwards, away from the ceramic vane 12 relative to the axis 11. The expansion pad 18 may allow for the different radial growth of the support carrier 14 while helping the components remain engaged and loaded.

In the illustrative embodiments, the airfoil assembly 10 includes load pads 56, 58 on the suction side 42 that sit either side of the resultant aerodynamic load vector. The precise locations of the pads 56, 58 may be optimized to equally share loading at each point.

In the illustrative embodiments, an expansion pad 18 is located on the pressure side 40, which may prevent rotation of the vane 12 and maintains stability of the vane 12. The location of the expansion pad 18 may be chosen such that the contact is always on the same side of the aerodynamic lift vector throughout the engine running range. In this way, there may be no unloading or reversal of loading when the pressure distribution varies. In the illustrative embodiment, the bias arm 16 extends from the support carrier 14 at an angle. The angle may be optimized depending on design conditions.

The expansion pad 18 that is fixed to the support carrier 14 may support the bias arm 16. In the illustrative embodiment, the expansion pad 18 is countersunk in a recess 62 in the support carrier 14. The recess 62 allows the expansion pad 18 to be larger in size. The larger the expansion pad 18 and greater the coefficient of thermal expansion, the more the expansion pad 18 may expand in size in response to heat. The more the expansion pad 18 expands, the more the relative extension of the bias arm 16 against the outer vane mount 32 increases. In other embodiments, the expansion pad 18 is coupled to a surface 270 of the flange 248 and does not extend into the support carrier 14.

In the illustrative embodiment, the load pads 56, 58 on the suction side 42 of the vane 12 may be attached to a flange 48 of the support carrier 14. The expansion pad 18 may be on the pressure side 40 of the vane 12. In other embodiments, the bias arm and expansion pad may be located on the suction side of the vane 12.

As the system heats up, the metallic materials may expand away from the ceramic matrix composite materials. The aerodynamic load may force the load pads 56, 58 on the suction side 42 to remain in contact with the outer vane mount 32. In the illustrative embodiment, the expansion pad 18 may then force the angle of the bias arm 16, relative to the support carrier 14, to increase. As a result, the relative movement of the second end 66 of the bias arm 16 may be greater than the expansion of the support carrier 14 away from the outer vane mount 32. Therefore, the support contact of the vane 12 to the support carrier 14 may be maintained during use of the airfoil assembly 10. In illustrative embodiment, the size and thickness of the bias arm 16 may be selected such that the bias arm 16 may survive the induced stresses of the relative movement.

In some embodiments, the exact form and dimensions of the pads 56, 58 on the suction side 42 may be chosen in order to minimize stress in the airfoil assembly 10. The dimensions of the pads 18 be chosen to optimize relative movement of the bias arm 16. More than one expansion pad 18 with a bias arm 16 may be used to minimize the stress in the flange 48.

In some embodiments, a compliance member may be introduced to one of the bias arm 16 and the expansion pad 18. One of the bias arm 16 and the expansion pad 18 may engage a compliant member so as not to over stress the ceramic matrix composite vane 12 under adverse thermal boundary conditions. Such thermal boundary conditions may include engine shut down at a specific altitude and then restarted.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An airfoil assembly for a gas turbine engine, the airfoil assembly comprising
a metallic support carrier that includes a wall and a flange that extends axially away from the wall relative to an axis, the flange having a first portion and a second portion spaced apart from the first portion to define a vane-receiver space there between, and the metallic support carrier having a first coefficient of thermal expansion,
a ceramic matrix composite vane adapted to interact with hot gases flowing through a gas path of the gas turbine engine during use of the airfoil assembly, the ceramic matrix composite vane including a first platform that defines a first boundary of the gas path, a second platform spaced apart axially from the first platform relative to the axis to define a second boundary of the gas path, an airfoil that extends axially between and interconnects the first platform and the second platform, and a vane mount that extends axially away from the first platform and located in the vane-receiver space defined by the flange of the metallic support carrier,
a bias arm coupled to the metallic support carrier and engaged with the vane mount of the ceramic matrix composite vane, and
an expansion pad located between the first portion of the flange included in the metallic support carrier and the bias arm, the expansion pad having a second coefficient of thermal expansion that is greater than the first coefficient of thermal expansion so that the expansion pad is configured to grow away from the first portion of the flange and engage the bias arm to cause the bias arm to move and urge the vane mount into engagement with the second portion in response to growth of the expansion pad during use of the airfoil assembly.

2. The airfoil assembly of claim 1, wherein the bias arm extends between a first end and a second end, the first end is fixed with the first portion of the flange, and the second end is cantilevered away from the first portion of the flange.

3. The airfoil assembly of claim 2, wherein the expansion pad engages the bias arm at a location between a midpoint of the bias arm and the first end of the bias arm to urge the second end into engagement with the vane mount of the ceramic matrix composite vane.

4. The airfoil assembly of claim 3, wherein the first portion of the flange is formed to define a recess that extends into the first portion and at least a portion of the expansion pad is located in the recess.

5. The airfoil assembly of claim 3, wherein the second portion of the flange is formed to define loads pads that extend away from the second portion of the flange and engage the vane mount of the ceramic matrix composite vane opposite the bias arm.

6. The airfoil assembly of claim 1, wherein the ceramic matrix composite vane has a leading edge, a trailing edge, a pressure side, and a suction side and the bias arm and the expansion pad are located between the pressure side of the vane mount and the first portion of the flange.

7. The airfoil assembly of claim 6, wherein the second portion of the flange is formed to define at least one load pad that extends away from the second portion of the flange and engages the suction side of the vane mount.

8. The airfoil assembly of claim 7, wherein the at least one load pad has a third coefficient of thermal expansion that is greater than the first coefficient of thermal expansion.

9. The airfoil assembly of claim 1, further comprising a metallic spar coupled with the wall of the metallic support carrier and the metallic spar extends axially through an interior cavity formed in the ceramic matrix composite vane.

10. An airfoil assembly for a gas turbine engine, the airfoil assembly comprising
a support carrier having a first coefficient of thermal expansion,
an airfoil unit that includes a platform, an airfoil that extends axially away from the platform relative to an axis, and a mount that extends axially away from the platform in a direction opposite the airfoil,
a bias arm coupled to the support carrier and engaged with the mount of the airfoil unit, and
an expansion pad located between the support carrier and the bias arm, the expansion pad having a second coefficient of thermal expansion that is greater than the first coefficient of thermal expansion.

11. The airfoil assembly of claim 10, wherein the bias arm extends between a first end and a second end thereof, the first end is fixed to the support carrier, and the second end is cantilevered away from the support carrier.

12. The airfoil assembly of claim 11, wherein the expansion pad engages the bias arm at a location between a midpoint of the bias arm and the first end of the bias arm to urge the second end of the bias arm into engagement with the mount of the airfoil unit.

13. The airfoil assembly of claim 10, wherein the support carrier is formed to define a recess that extends into the support carrier and at least a portion of the expansion pad is located in the recess.

14. The airfoil assembly of claim 10, wherein the airfoil unit has a leading edge, a trailing edge, a pressure side, and a suction side and the expansion pad is located between the mount and the support carrier on the pressure side.

15. The airfoil assembly of claim 10, wherein the support carrier includes a wall that extends radially at least partway about the axis and a flange that extends axially away from the wall relative to the axis, and wherein the flange is formed to define at least one load pad that extends away from the flange and engages the mount.

16. The airfoil assembly of claim 15, wherein the at least one load pad has a third coefficient of thermal expansion that is greater than the first coefficient of thermal expansion.

17. A method comprising
providing an airfoil assembly that includes a support carrier, a vane, a bias arm, and an expansion pad, the support carrier having a first coefficient of thermal expansion and including a wall and a flange that extends away from the wall, the flange having a first portion and a second portion that includes contact pads, the expansion pad having a second coefficient of thermal expansion that is greater than the first coefficient of thermal expansion, and the expansion pad located between the first portion of the flange and the bias arm, and
heating the airfoil assembly to cause the expansion pad to grow relative to the flange and engage the bias arm to move the bias arm to urge the vane into engagement with the contact pads.

18. The method of claim 17, wherein the bias arm includes a first end fixed to the flange and a second end that is cantilevered away from the first portion of the flange.

19. The method of claim 18, wherein the first portion of the flange is formed to define a recess that extends into the first portion and at least a portion of the expansion pad is located in the recess.

20. The method of claim 18, wherein the vane has a leading edge, a trailing edge, a pressure side, and a suction side and the bias arm and the expansion pad are arranged on the pressure side of the vane.

* * * * *